April 16, 1957 H. B. FREY, JR 2,789,241
HIGH-VOLTAGE GENERATORS
Filed April 14, 1952 2 Sheets-Sheet 1

INVENTOR.
HUGH B. FREY JR.
BY
Campbell, Brumbaugh, Free & Graves
HIS ATTORNEYS

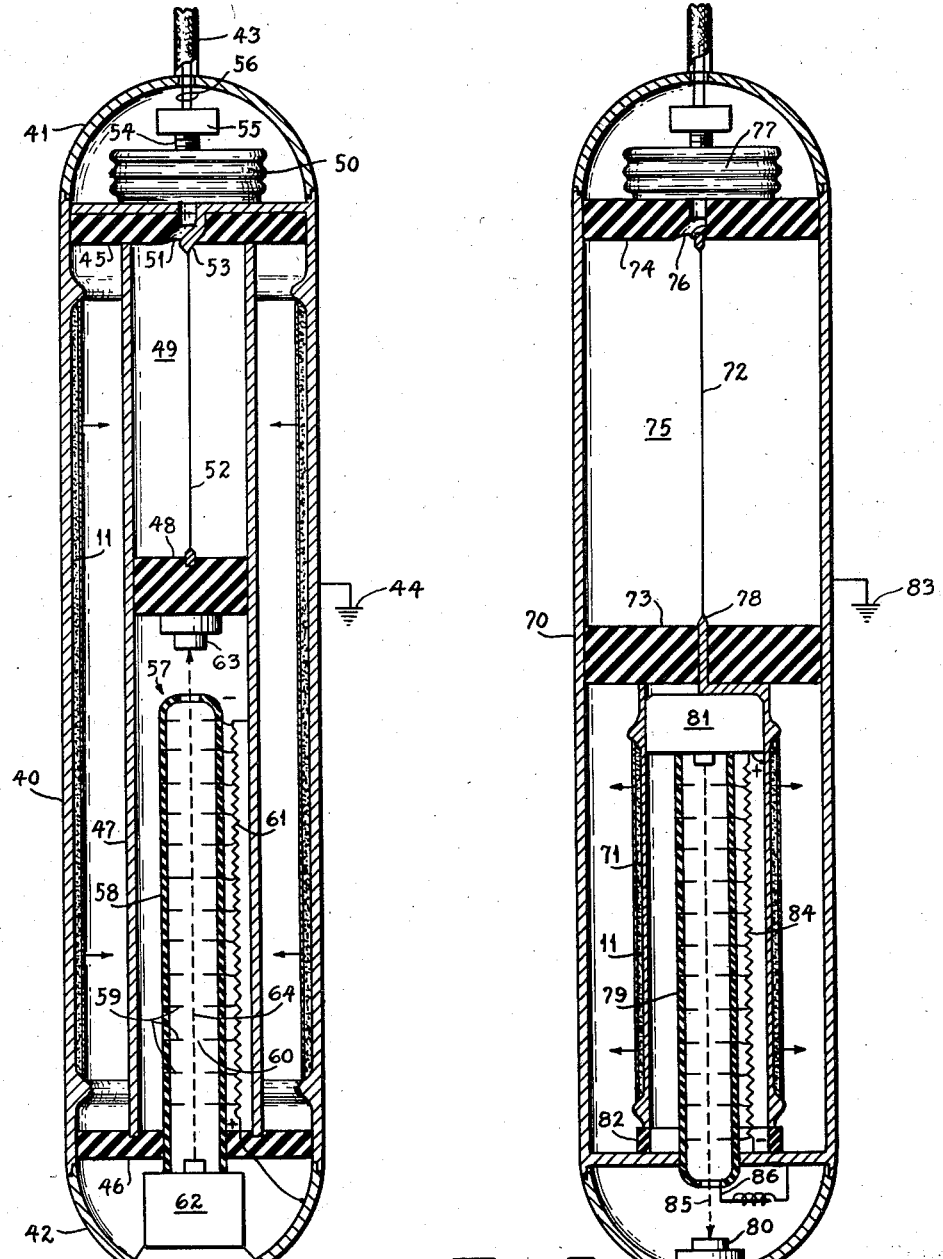

United States Patent Office 2,789,241
Patented Apr. 16, 1957

2,789,241

HIGH-VOLTAGE GENERATORS

Hugh B. Frey, Jr., Ridgefield, Conn., assignor to Schlumberger Well Surveying Corporation, Houston, Tex., a corporation of Delaware Application April 14, 1952, Serial No. 282,143

21 Claims. (Cl. 313—61)

This invention relates to improvements in high-voltage generators wherein electrical energy is derived from nuclear reactions. More particularly, this invention relates to novel self-contained units for generating and regulating voltages substantially above twenty thousand volts.

In general, accurately regulated high-voltage sources are bulky and cumbersome, requiring considerable space in the laboratory. Further, in certain operations outside the laboratory, such sources are unwieldy and impractical.

For example, in the case of the radioactivity well logging of formations, it has been proposed to employ various logging instruments in the borehole such as radioactive radiation sources requiring regulated high voltages for their operation. The usual high-voltage generators found in the laboratory today are far too bulky to fit within the confines of a borehole. It is possible, of course, to locate the generator at the surface and conduct the high voltage down through a supporting cable to the instrument, but because of the problem of insulating the supporting cable and the danger to operating personnel, this solution is not particularly satisfactory. It would be more advantageous if there could be provided a completely self-contained source of accurately regulated high voltage adapted to fit within the confines of a borehole and requiring no electrical connections to the surface whatsoever. Such a generator could then be passed through the borehole with the logging instrument and many of the former problems such as insulation in supporting cables and bulky surface equipment could be avoided. Moreover, a self-contained regulated voltage source of this nature would have many applications in other fields where economy of space is a paramount consideration.

One known type of high-voltage source which would obviate to some extent the problem of providing a self-contained generator is described in U. S. Patent No. 2,517,120 granted to E. G. Linder on August 1, 1950. This type of voltage generator derives its high potential from charged particles emitted by radioactive material. Since its internal impedance is high and non-linear, being determined by the energy spectrum of charged particles escaping from the radioactive material, the output voltage of such a generator will vary with changes in the connected load impedance. This characteristic cannot be tolerated when the load requires a substantially constant voltage regardless of current requirements over a limited range.

It is an object of the present invention, accordingly, to provide a novel self-contained accurately regulated high-voltage generator.

Another object of the invention is to provide a generator of the type deriving its energy from radioactive disintegration, having an output voltage which is constant regardless of current requirements within a prescribed range.

An ancillary object of the invention is to provide a constant high-voltage generator of the type deriving its energy from radioactive disintegration, wherein the maximum voltage and/or current output may be substantially increased while using the same quantity of radioactive material.

A particular object of the invention is to provide a novel combination of an improved high-voltage generator, voltage regulator, and a source of radioactive radiation in a compact portable form adapted to fit within the confines of an oil well borehole.

These and other objects of the invention are attained by means of an improved type of high-voltage generator deriving its energy from nuclear reactions and incorporating in its construction, in a novel combination, a corona-discharge voltage regulator. The corona-discharge regulating device may be arranged coaxially with cylindrical electrodes, between which a potential is developed by means of a radioactive coating on the walls of one or more of the electrodes. The regulator operates by establishing a critical characteristic corona-discharge voltage between two coaxial cylindrical electrodes. This critical voltage may be changed by varying the pressure of the gas medium in the voltage regulator.

In another embodiment, three or more coaxial cylindrical electrodes are employed and radioactive material coated on the walls of each of two or more inner or outer adjacent electrodes, thereby substantially increasing the voltage developed between the innermost and outermost electrodes.

In still further embodiments the high-voltage generator and regulator include a linear accelerator coaxially incorporated to provide a compact composite source of high-speed bombarding particles.

Other objects and advantages of the invention will become apparent during the course of the following description taken in conjunction with the accompanying drawings in which:

Fig. 5 is a sectional view of a preferred embodiment of the invention in combination with a linear accelerator useful, for example, in radioactivity borehole logging; and Fig. 6 is a sectional view of a modified form of the apparatus of Fig. 5.

Figure 1:
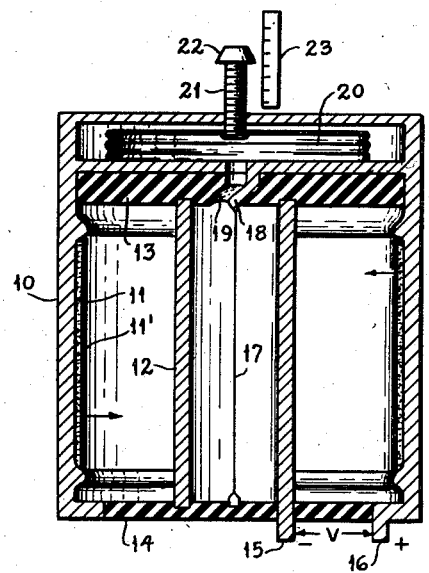
Fig. 1 is a sectional view of one form of the improved constant high-voltage generator of the present invention.

Referring to Fig. 1, there is illustrated one form of high-voltage generator comprising an electrically conductive cylindrical container 10 which may serve the combined functions of a pressure-resistant housing and a source electrode for the generator. The source electrode 10 is coated on its inside cylindrical surface with a radioactive material 11. The coating 11 is covered with a thin aluminum foil 11' conductively connected to the source electrode 10. The foil 11' prevents static charges from accumulating on the coating 11 as a result of the insulating qualities of the coating. The foil 11', however, may be omitted when the coating 11 is made of a conductive material. As shown in Fig. 1, a collector electrode 12 is coaxially disposed within the electrode 10 and is secured to and supported by the electrode 10 by means of annular insulating blocks 13 and 14 disposed at the upper and lower ends, respectively, of the electrode 12. From the lower end of the collector electrode 12, an electrically conductive extension passes through insulating block 14 to form a negative electrode terminal 15. Similarly, a small extension from the lower portion of the source electrode 10 provides a positive terminal 16, the terminals 15 and 16 constituting the output terminals of the high-voltage generator. The annular space between the inner wall of the source electrode 10 and the outer wall of the collector electrode 12 is maintained at a high vacuum.

In order to control the amplitude of the high voltage appearing at the terminals 15 and 16, a corona-discharge regulator is integrally formed with the collector electrode 12, and may comprise a thin electrically conductive wire 17 stretched between the insulating blocks 13 and 14 and coaxially disposed within the electrode 12. The lower end of the wire 17 is imbedded in the insulating block 14, but the upper end is conductively secured to a metallic flange 18, which extends through an opening 19 in the insulation block 13 and is integrally secured to the source electrode 10.

The opening 19 additionally provides communication between the interior of the electrode 12 and the interior of a bellows 20. A bolt 21 is secured to the top of the bellows 20 and is threaded through the upper housing of the electrode 10. The bolt 21 is terminated with a manually operable knob 22. A scale 23 may be provided to show how far the bolt 21 is extended. An ionizable gas is introduced into the interior of the electrode 12 and the bellows 20. The pressure of the gas may be manually adjusted by turning the knob 22 to compress or expand the bellows 20. The high vacuum maintained in the annular space between the electrodes 10 and 12 is hermetically sealed from the gas within the electrode 12 by the insulating blocks 13 and 14.

In operation, the radioactive coating 11 ejects high-speed charged particles toward the outer wall of the collector electrode 12 as indicated by the arrows in Fig. 1. If the coating 11 comprises the radioactive element strontium (Sr 90 which includes its daughter yittrium Y 90), in the form of strontium chloride (SrCl₂), for example, high-speed negative electrons or beta particles will be emitted. Such radioactive sources of high-speed electrons are called beta emitters. However, it will be understood that a radioactive coating consisting of an alpha particle emitter may be employed. The alpha particles are positively charged high-speed helium nuclei and are emitted by such substances as polonium (Po 210), for example. In the event that a positive particle emitter is used, the coating should be placed on the outside wall of the electrode 12 rather than on the electrode 10 in order to render the electrode 12 negative relative to the electrode 10. In all cases the wire 17 of the voltage regulator must be positive with respect to the cylindrical tubular electrode which coaxially surrounds the same. It is also possible to coact the electrode 10 with a negative particle emitter and the electrode 12 with a positive particle emitter thereby charging the electrode 10 positively at the same time the electrode 12 is being charged negatively.

For purposes of the present specification the operation of the generator and its various embodiments will be described using only a beta-emitter as the radioactive coating material, although it should be kept in mind that any radioactive source emitting a stream of positively or negatively charged particles or ions could be used.

Electrons from the beta-emitter material 11 will accumulate on the collector electrode 12 until the negative charge on the electrode 12 reaches a value such that electrons from the beta-emitter no longer have sufficient speed or energy to overcome the repulsion of the electric field and reach the collector electrode 12 and are accordingly turned back. For example, if Sr 90 is used, its daughter Y 90 will also be present and will emit electrons having a range of energies from 0 to 2.16 million electron volts. Accordingly, in the absence of a voltage regulator or a load connected across the terminals 15 and 16, the negative charge on the electrode 12 will rise to a potential equal to, but not greater than, 2.16 million volts.

Figure 2:
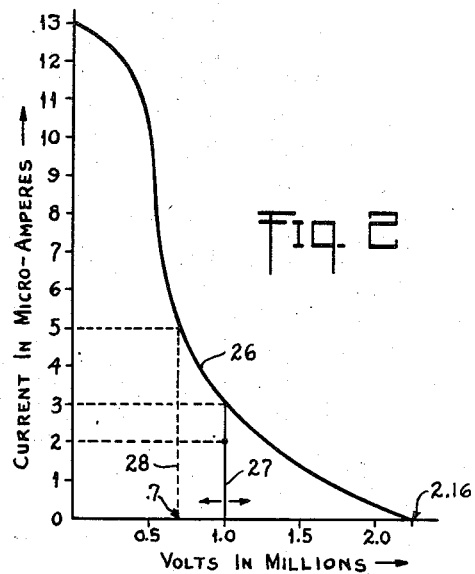
Fig. 2 is a graph of the relationship between current output and voltage output for the generator of Fig. 1.

This condition is illustrated in the curve 26 of Fig. 2 which shows the current-voltage relationship for the device of Fig. 1. The shape of this curve depends upon the thickness of the radioactive coating 11 and the energy spectrum of the emitted particles. Any point on the ordinate axis, designated as the current in microamperes, is proportional to the number of charged particles per unit time having energies equal to or greater than the corresponding abscissa point in millions of electron volts. Thus, in the example of Y 90, the number of electrons having energies equal to 2.16 million electron volts is exceedingly small. Most of the electrons having energies to the left of this point on the abscissa scale are turned back by the electric field. On the other hand, the number of electrons having energies equal to or greater than 1 million electron volts is appreciable and is represented by about 3 microamperes on the ordinate scale opposite the point on the curve 26 corresponding to 1 million volts.

It should be noted that the abscissa points in Fig. 2 represent the voltages appearing at the terminals 15 and 16 of the generator. These same voltages also exist between the wire 17 and collector electrode 12 of the regulator shown in Fig. 1 because of the conductive connection between the upper end of the wire 17 and the source electrode 10.

As previously described, the interior of the collector electrode 12 surrounding the wire 17 is filled with an ionizable gas the pressure of which may be varied by the bellows 20. This gas is capable of establishing a corona-discharge between the collector electrode 12 and the wire 17 at a critical voltage dependent upon the composition and pressure of the gas and the physical dimensions of the electrode 12 and the wire 17. If the pressure of gas is adjusted to a particular value by rotating the knob 22, a critical starting potential is determined above which a retransference of charge between the collector electrode 12 and the source electrode 10 will take place through the gaseous medium and below which no retransference will take place.

Suppose, for example, that the critical starting potential is adjusted, by altering the gas pressure, to a value of 1 million volts. Referring to the curve 26, it will be seen that this means that 3 microamperes of current, corresponding to all charged particles having energies equal to or greater than 1 million electron volts, will be retransferred. The voltage available at the terminals 15 and 16 will be 1 million volts. The indicator 23 may be calibrated to read 1 million volts, for this setting of the knob 22.

Assume now, that an external load is connected across the terminals 15 and 16. Further assume, for example, that the load current is 2 microamperes at 1 million volts. As shown by the curve 26 of Fig. 2, with the regulator set for 1 million volts, there is available a current of 3 microamperes. Two microamperes of this current will be drawn from the terminals 15 and 16, the remaining 1 microampere now constituting the sum of the retransference charges in the regulator. Thus, the regulator at the setting shown has the property of retransferring only those charges that have energies equal to or greater than the established critical potential and are not consumed in an external load. Accordingly, when the regulator is set at 1 million volts, a current may be drawn from the terminals 15 and 16 which may range from 0 to 3 microamperes without affecting the constant voltage output of 1 million volts. Setting the regulator for 1 million volts has the effect of chopping off the curve 26 of Fig. 2 at the asbscissa point of 1 million volts as shown by the solid vertical line 27. Considering the vertical line 27 as part of the curve 26 then, it will be clear that any current from 0 to 3 microamperes may be drawn without altering the output voltage.

It should also be clear from the above description that the vertical line 27 can be moved to the right or left as indicated by the arrows by rotating the knob 22 of the regulator, since this knob adjusts the gas pressure in the regulator which in turn determines the critical or minimum starting voltage at which the corona discharge occurs.

As a further example, suppose the hypothetical load across the terminals 15 and 16 draws 5 microamperes and it is desired to operate the load at 1 million volts. As shown by a dashed vertical line 28 in Fig. 2, if 5 microamperes are drawn, the voltage will drop to .7 million volts. This is because the radioactive coating is just sufficient to supply 3 microamperes of charged particles having energies greater than 1 million volts and 5 microamperes of charged particles having energies greater than .7 million volts. Since the regulator is adjusted to limit the voltage at 1 million volts, and since it cannot increase the power output of the radioactive coating, the regulation is not effective.

The pressure in the regulator could be varied, however, to render the regulator operable at a critical or minimum starting voltage of .7 million volts. So adjusting the regulator would have the effect of moving the solid vertical line 27 to the left to coincide with the dashed vertical line 28. In such case, the voltage at the terminals 15 and 16 would remain constant at .7 million volts regardless of the value of the current drawn within the range from 0 to 5 microamperes.

By a modification of the apparatus of Fig. 1, however, a current of 5 microamperes at a constant voltage of 1 million volts can be attained without increasing the quantity of the radioactive coating material 11. Such a modified generator is illustrated in Fig. 3.

Figure 3:
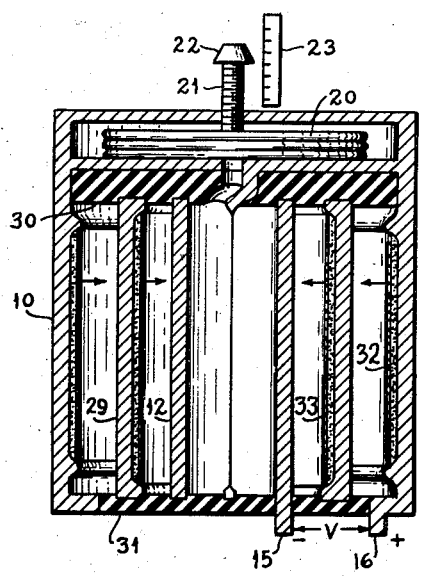
Fig. 3 is a sectional view of a modified embodiment of the generator of Fig. 1.

In Fig. 3 the portions of the generator that are the same as the generator of Fig. 1 are designated by the same reference numerals. In this modified high-voltage generator a further cylindrical electrode 29 is coaxially positioned and supported between the electrodes 10 and 12 by means of annular insulating blocks 30 and 31 disposed at the upper and lower ends, respectively, of the cylinder 29. An amount of radioactive coating material equal to that employed in the coating 11 of Fig. 1 is used, one half in a coating 32 on the inside of the source electrode 10 and the other half in a coating 33 on the inside of the additional electrode 29.

Figure 4:
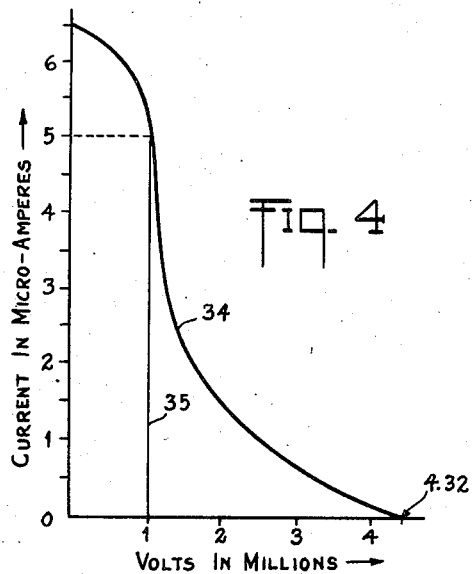
Fig. 4 is a graph of the relationship between current output and voltage output for the generator of Fig. 3.

Assuming that the coating 32 and 33 each comprise Sr 90 and thus its daughter Y 90 as in Fig. 1, 2.16 million volt potential differences will tend to build up between the electrodes 10 and 29, and between the electrodes 29 and 12, respectively. The maximum output voltage at the terminals 15 and 16 is equal to the sum of these two potentials which is 4.32 million volts. The available number of particles traveling to the collector electrode 12, however, is now only one-half the number flowing in the apparatus of Fig. 1 since only half of the radioactive material is used to supply particles to this electrode. It is assumed in these curves and examples for explanatory purposes that the coating of radioactive material is only one molecule thick. The current versus voltage curve for the modified generator of Fig. 3 will be of the same general form as the curve of Fig. 2 since the same radioactive coating material is used and both layers are assumed to be monomolecular, but the current scale will be halved and the voltage scale doubled. This curve is designated 34 and is shown in Fig. 4.

For a setting of the regulator of this modified generator at 1 million volts, it will now be seen by following the vertical line 35 that 5 microamperes may be drawn without any decrease in the output voltage. Hence by merely rearranging the radioactive beta emitter as in the modified generator of Fig. 3, a current range from 0 to 5 microamperes can be drawn at a constant voltage of 1 million volts, while in the generator of Fig. 1 using exactly the same amount of beta emitter material, only a current range from 0 to 3 microamperes could be drawn at a constant voltage of 1 million volts. This anomaly results from the fact that the curves 26 and 34 are not linear.

It will be appreciated, of course, that each electrode 10 and 29 of the modified generator shown in Fig. 3 could be coated with the same amount of radioactive material as is contained in the coating 11 in Fig. 1. In this case the current would remain the same but the voltage scale would be doubled. Under such circumstances, at a voltage of 1 million volts, current up to 10 microamperes could be drawn without causing any drop in the output voltage. Moreover, additional cylindrical electrodes may be inserted in the generator and suitably coated with radioactive material to yield even higher voltages. Furthermore, if the same amount of material is distributed on two electrodes as in Fig. 3, the generator may be made smaller in its vertical dimensions since only a fraction of the original area of each emitting surface is required.

The voltage generators described in Figs. 1 to 4 are thus seen to provide a compact constant high-voltage source wherein the output voltage may be set at any desired value and maintained constant as long as the current requirements do not exceed a predetermined value.

In view of the extremely compact construction and the constant voltage feature of this type of generator, it is well suited for use with a linear accelerator wherein it is desired to provide a stream of constant high-speed bombarding particles in a limited space, such as an oil well borehole, for example.

Figs. 5 and 6 disclose different embodiments of a combination of such a generator, voltage regulator, and linear accelerator which may be used, for example, as a source of high-speed neutrons.

While the combination high-voltage generators and accelerators of Figs. 5 and 6 may be employed anywhere to produce a stream of either positively or negatively charged particles for bombarding a target to yield different types of radiations, the particular embodiments of the invention to be described by way of example are especially suitable for use in boreholes to provide a source of substantially monoenergetic neutrons for neutron logging.

The apparatus of Fig. 5 comprises an elongated cylindrical body 40 closed at its upper and lower ends by metallic covers 41 and 42 respectively. A cable 43 carrying one or more electrical conductors may be secured to the cover 41 for lowering and raising the body 40 in an oil well borehole in the usual manner. The cylindrical body 40 combines the functions of a pressure-resistant housing and a source electrode for a high-voltage generator. The outer surface of this source electrode 40 is in direct contact with borehole liquids and is electrically at ground potential as indicated schematically at 44. The inner surface is coated with a suitable beta emitter 11.

Supported coaxially at its upper and lower ends within the source electrode 40 by annular insulating blocks 45 and 46 respectively is another elongated cylindrical body constituting a collector electrode 47.

A pressure-sealing insulating block 48 within the collector electrode 47 defines together with the upper portion of the cylindrical collector electrode 47 and the upper annular insulating block 45 a gas-filled chamber 49 communicating with a bellows 50 through a passage 51. A wire 52, conductively connected to the source electrode 40 at its upper end by means of a flange element 53 extending through the passage 51, is coaxially arranged within the chamber 49 and is secured at its lower end by the insulating block 48. The pressure in the chamber 49 may be changed by compressing or expanding the bellows 50 by means of a bolt 54 rotatably secured thereto. The bolt 54 is rotatable by a small reversible motor 55 which may be remotely controlled through conductors 56 contained in the cable 43.

The wire 52, the chamber 49, the upper portion of the collector electrode 47, and the bellows 50 constitute a corona-discharge voltage regulator similar in structure and operation to that of Fig. 1.

The lower portion of the collector electrode 47 houses a linear accelerator tube 57 coaxially disposed with respect thereto. The accelerator tube 57 may include a highly evacuated insulating cylinder 58 having flat circular disk electrodes 59 with central openings 60, disposed perpendicularly to and coaxially with the axis of the cylinder 58 and supported at equal spacings by the insulating cylinder.

A suitable ion source 62, providing positively charged particles such as deuterons (deuterium ions), for example, is mounted at the lower end of the insulating cylinder 58 and is electrically connected to the source electrode 40. Above the upper mouth of cylinder 57 is provided a target element 63 such as tritium, for example.

Each disk electrode 59 along the path from the ion source 62 to the target 63 is maintained at a greater negative potential than the preceding disk electrode by means of a simple voltage dividing resistor 61 tapped along its length by small leads connected to the respective electrodes. As shown in Fig. 5, the resistor 61 is conductively connected at its upper and lower ends to the collector electrode 47 and the source electrode 40, respectively.

In operation of the apparatus of Fig. 5, the voltage between the electrodes 47 and 40 due to beta emission from the coating 11 is maintained at about 100 kilovolts by the corona-discharge voltage regulator as explained in connection with Fig. 1. Referring to Fig. 2, it will be seen that a relatively large current may be drawn at this voltage. Since the source electrode 40 is grounded, and is positive with respect to the collector electrode 47, the collector electrode 47 will be at a high negative potential with respect to the source electrode 40 and ground. It is apparent that personnel will be protected from the high voltage components of the apparatus by this arrangement.

The accelerator tube 57 will accelerate positively charged particles from the ion source 62 along the axis of the accelerator tube, as indicated by a dashed line 64, through the action of the potential gradient developed along the length of the tube by the disk electrodes 59. Thus, with respect to the source electrode 40 the positively charged particles or deuteron ions from the ion source 62 will be successively subjected to an increasing negative potential until they leave the end of the accelerator tube at which time they will have sufficient speed to release high-energy neutrons from the target element 63 upon bombarding the same.

The positively charged particles forming the ion beam may be stopped by turning off the voltage supply to the ion source 62.

Fig. 6 illustrates a modified version of the apparatus of Fig. 5 wherein the beta emitter material 11 is coated on the outside wall of an inner cylindrical electrode 71. Thus, in this modified form, an outer cylindrical housing 70 will constitute a collector electrode, and the inner metallic cylinder 71 will constitute a source electrode. Since the elongated wire of the voltage regulator is always connected to the positive electrode, a somewhat different arrangement of the various regulator components is necessary.

As shown in Fig. 6, the inner source electrode 71 terminates at its upper end in an insulating block 73 secured to the outer housing 70. A further annular insulating block 74 defines together with the upper portion of the housing 70, a voltage regulator chamber 75. As in the other embodiments, this chamber communicates through a passage 76 with a bellows 77. The central coaxial corona-discharge electrode is formed as a wire 72. It will be noted that the wire 72 is conductively connected by a flange element 78 to the inner source electrode 71 since this electrode is positive with respect to the collector electrode, that is, the housing 70.

Disposed within the source electrode 71 is an elongated linear accelerator tube 79 identical to that shown in Fig. 5 but relatively reversed in order that it may accelerate postively charged particles downwardly toward a target element 80. An ion source 81 associated with the tube 79 is located at the top of the inner source electrode 71 and is electrically connected thereto. An annular insulating block 82 supports the source electrode 71 at its lower end in axial alignment with the outer collector electrode or housing 70.

The housing 70 is electrically at ground potential as indicated schematically at 83 so that in the operation of the apparatus of Fig. 6, the source electrode 71 accumulates a large positive potential with respect to ground. This potential is applied across a voltage dividing resistor 84, corresponding to the resistor 61 of the accelerator of Fig. 5, and in the arrangement of Fig. 6, provides a potential gradient along the accelerator tube 79 which progressively increases negatively from top to bottom. Positive particles from the ion source 81 will be attracted and accelerated by this potential gradient to form a beam of bombarding particles as indicated by the dashed line 85. A solenoid-operated shutter mechanism 86 may be provided for blocking the bombarding particles from the target element 80. This shutter may comprise an aluminum plate, for example, and is alternative to the turning off the ion source voltage supply as a means for interrupting bombardment.

While it will be noted that in the embodiment of Fig. 6, not as much area is available for the beta emitting coating 11 as in Fig. 5, the constructional features are advantageous if a positive emitting coating, that is, an alpha-ray emitter, is to be applied to the inside surface of the housing 70. In this case no rearrangement of the component parts of the apparatus of Fig. 6 is necessary.

It should be kept in mind that negatively charged bombarding particles could be provided by the ion sources 62 and 81 in which case the polarity at each end of the accelerating tubes would be reversed in order to effect acceleration of such negative particles. This reversal could be accomplished in Fig. 5 by simply inverting accelerator tube 57 so that it would be disposed as in Fig. 6, no other changes being necessary. Similarly, the accelerator tube in Fig. 6 could be reversed to assume the position shown in Fig. 5.

It is also to be understood that the high-voltage generators of Figs. 5 and 6 could be designed with additional radioactive emitting electrodes, in accordance with the generator of Fig. 3, thereby providing a very high output voltage for the accelerator tubes. Also, in any one of the disclosed embodiments, it is possible to coat the collector electrode with alpha or positively charged particle emitters thereby increasing even further the available voltage. Thus, as already mentioned in Figs. 1 and 3 the outer cylindrical walls of the collector electrode 12 and electrodes 12 and 29, respectively, could be coated. Similarly in Figs. 5 and 6, the electrodes 47 and 70, respectively, could be coated with a positive emitter.

In the actual construction of the various embodiments, the coated electrodes and all surfaces exposed to the emitted beta particles should be made of material of low atomic number, such as aluminum or plastic material provided with a conductive layer, for example, to reduce harmful radiations resulting from the absorption of electrons by such exposed surfaces.

Various modifications including different types of emitters for the high-voltage generators and different arrangements of the accelerator tubes will occur to those skilled in the art. Moreover, while best results for the current available with the described apparatus can be obtained with a corona discharge type regulator, it is also within the scope of this invention to use other types of gas discharge devices such as a glow type discharge voltage regulator when a much greater amount of current is available. The invention is not limited to the particular embodiments disclosed but only by the scope of the appended claims.

I claim:

1. Apparatus for generating a high voltage of relatively constant amplitude comprising first and second electrodes, a radioactive coating on at least one of said electrodes providing charged particle emission, a conductive surface on at least the other of said electrodes for collecting charged particles flowing in response to said emission to establish a potential difference between said first and second electrodes, and a gas discharge device connected between said first and second electrodes for establishing a corona-discharge when the potential difference therebetween exceeds a predetermined value to maintain said potential difference substantially constant.

2. Apparatus according to claim 1 provided with a further electrode intermediate the first and second electrodes having at least one conductive surface and one radioactive coating and positioned so that charged particles may be collected from at least said one of said first and second electrodes and charged particles may be emitted toward at least said other of said first and second electrodes.

3. Apparatus for generating a high voltage of relatively constant amplitude comprising first and second electrodes, a radioactive coating on at least one of said electrodes providing charged particle emission, a conductive surface on at least the other of said electrodes for collecting charged particles flowing in response to said emission to establish a potential difference between said first and second electrodes, a cylindrical corona-discharge electrode connected to the electrode of said first and second electrodes that is at a higher positive potential, a cylindrical tubular electrode connected to the electrode of said first and second electrodes that is at a lower positive potential and coaxially surrounding said corona-discharge electrode, and a gas filling between said corona-discharge electrode and said cylindrical tubular electrode for establishing a corona discharge above a predetermined potential difference therebetween.

4. Apparatus according to claim 3 having a further electrode intermediate the first and second electrodes having at least one conductive surface and one radioactive coating and positioned so that charged particles may be collected from at least said one of said first and second electrodes and charged particles may be emitted toward at least said other of said first and second electrodes.

5. Apparatus for generating a high voltage of relatively constant amplitude comprising first and second electrodes, a radioactive coating on at least one of said electrodes providing charged particle emission, a conductive surface on at least the other of said electrodes for collecting charged particles flowing in response to said emission to establish a potential difference between said first and second electrodes, a corona-discharge electrode connected to the electrode of said first and second electrodes that is at a higher positive potential, said corona-discharge electrode being coaxially mounted within the electrode of said first and second electrodes that is at a lower positive potential, and a gas filling between said last-mentioned electrode and said corona-discharge electrode for establishing a corona discharge above a predetermined potential difference between said corona-discharge electrode and the electrode surrounding the same.

6. Apparatus according to claim 5 having a further electrode intermediate the first and second electrodes having at least one conductive surface and one radioactive coating and positioned so that charged particles may be collected from at least said one of said first and second electrodes and charged particles may be emitted towards at least said other of said first and second electrodes.

7. Apparatus for generating a high voltage of relatively constant amplitude comprising an emitter electrode containing a radioactive substance providing charged particle emission, a collector electrode adjacent to said emitter electrode for collecting said emitted particles to establish a potential difference with respect to said emitter electrode, a corona-discharge electrode connected to the one of said emitter and collector electrodes that is at a higher positive potential, said corona-discharge electrode being coaxially mounted within the other of said electrodes, and a gas filling between said other of said electrodes and said corona-discharge electrode for establishing a corona discharge above a predetermined potential difference therebetween.

8. Apparatus according to claim 7 further provided with means for varying the pressure of the gas filling to adjust the starting voltage of the corona discharge.

9. Apparatus for generating a high voltage of relatively constant amplitude comprising a cylindrical tubular emitter electrode coated with a radioactive substance providing charged particle emission, a cylindrical tubular collector electrode coaxially mounted with respect to said emitter electrode for collecting said emitted particles to establish a potential difference with respect to said emitter electrode, a cylindrical corona-discharge electrode connected to the one of said emitter and collector electrodes that is at a higher positive potential, a cylindrical tubular electrode coaxially surrounding said corona-discharge electrode and connected to the other of said emitter and collector electrodes, and a gas filling between said corona-discharge electrode and the electrode surrounding the same for establishing a corona discharge above a predetermined potential difference therebetween.

10. Apparatus according to claim 9 wherein the corona-discharge electrode has a radius small compared with the radius of the electrode within which said corona-discharge electrode is mounted.

11. Apparatus for generating a high voltage of relatively constant amplitude comprising an electrode coated with a radioactive substance adapted to radiate charged particles, a second electrode in the form of a cylindrical tube for receiving said charged particles, a third electrode within said second electrode and coaxial therewith, said third electrode being connected to said first electrode, and a gas filling between said second and third electrodes for establishing a corona discharge above a predetermined potential difference therebetween.

12. Apparatus according to claim 11 further provided with means for varying the pressure of the gas filling to adjust the starting voltage of the corona discharge.

13. Apparatus for generating a high voltage of relatively constant amplitude comprising an electrode coated with a radioactive substance adapted to emit beta particles, a second electrode in the form of a cylindrical tube for receiving said beta particles, a third electrode within said second electrode and coaxial therewith, said third electrode being connected to said first electrode and having a radius small compared to said second electrode, and a gas filling between said second and third electrodes for establishing a corona discharge above a predetermined potential difference therebetween.

14. Apparatus for generating a high voltage of relatively constant amplitude comprising a first cylindrical tubular electrode having the inside surface thereof coated with a radioactive substance adapted to radiate charged particles, a second cylindrical tubular electrode within said first electrode for receiving said charged particles, a third electrode within said second electrode and coaxial therewith, said third electrode being connected to said first electrode and having a radius small compared to said second electrode, and a gas filling between said second and third electrodes for establishing a corona discharge above a predetermined potential difference therebetween.

15. Apparatus for generating a high voltage of relatively constant amplitude comprising a series of tubular emitter electrodes one inside another, each of said electrodes having radioactive material on one of its surfaces providing charged particle emission and all but the first emitter electrode serving to collect charged particles on the other of its surfaces, a final collector electrode for collecting the charged particle emission from the last emitter electrode, and a corona-discharge device connected between said first emitter electrode and said final collector electrode and having a gas filling for establishing a corona-discharge above a predetermined potential difference therebetween for maintaining said potential difference substantially constant.

16. Apparatus for generating a high voltage of relatively constant amplitude comprising a series of tubular emitter electrodes one inside another, each of said electrodes having radioactive material on its interior surface providing beta particle emission and all but the outermost emitter electrode serving to collect beta particles on its exterior surface, a final collector electrode for collecting the beta emission from the innermost electrode, and a corona-discharge device connected between said final collector electrode and said outermost emitter electrode and having a gas filling for establishing a corona-discharge above a predetermined potential difference therebetween for maintaining said potential difference substantially constant.

17. Apparatus for generating a high voltage of relatively constant amplitude comprising a plurality of cylindrical tubular emitter electrodes one inside another, each of said electrodes having radioactive material on its interior surface providing beta particle emission and all but the outermost emitter electrode serving to collect beta particles on its exterior surface, a final collector electrode for collecting the beta emission from the innermost electrode, a corona-discharge electrode coaxially mounted within said final collector electrode, said corona-discharge electrode being connected to said outermost emitter electrode, and a gas filling between said final collector and said corona-discharge electrodes for establishing a corona discharge above a predetermined potential difference therebetween.

18. A self-contained source of radioactive radiation comprising first and second electrodes, a radio-active coating on at least one of said electrodes providing charged particle emission, a conductive surface on at least the other of said electrodes for collecting charged particles flowing in response to said emission to establish a potential difference between said first and second electrodes, a corona-discharge device connected between said first and second electrodes for regulating the potential difference therebetween, a source of particles, an accelerator connected across said first and second electrodes for accelerating the particles, and a target containing a substance adapted to react with the accelerated particles to produce radioactive radiation of a type different from that emitted by the radioactive coating.

19. A self-contained source of radioactive radiation according to claim 18 wherein the accelerated particles are ions and the accelerator is a linear device subjecting the ions to an electric field.

20. A self-contained source of radioactive radiation comprising first and second cylindrical coaxial electrodes, a radioactive coating on at least one of said electrodes providing charged particle emission, a conductive surface on at least the other of said electrodes for collecting charge particles flowing in response to said emission to establish a potential difference between said first and second electrodes, a corona-discharge device connected between said first and second electrodes for regulating the potential difference therebetween, a source of ions, a cylindrical accelerator mounted within said first and second electrodes and connected across said first and second electrodes for accelerating the ions and a target containing a substance adapted to react with the accelerated ions to produce radioactive radiation of a type different from that emitted by the radioactive coating.

21. A self-contained source of radioactive radiation according to claim 20 wherein the ions are deuterons and the target contains tritium which reacts with the accelerated deuterons to produce neutrons.

References Cited in the file of this patent

UNITED STATES PATENTS

| | | |
|---|---|---|
| 2,517,120 | Linder | Aug. 1, 1950 |
| 2,523,287 | Friedman | Sept. 26, 1950 |
| 2,555,143 | Linder | May 29, 1951 |

OTHER REFERENCES

"A New Electronic Battery." The Electrician, vol. 10, Oct. 31, 1924, page 497.

"Nuclear Electrostatic Generator," Linder Physical Review, vol. 71, No. 2, Jan. 15, 1947, pp. 129–130.